US012668759B2

(12) United States Patent
Sun et al.

(10) Patent No.: US 12,668,759 B2
(45) Date of Patent: Jun. 30, 2026

(54) TABLEWARE DETERGENT TABLET, AND METHODS FOR PREPARING AND USING THE SAME

(71) Applicant: Guangzhou Joyson Cleaning Products Co., Ltd., Guangzhou (CN)

(72) Inventors: Jianfeng Sun, Guangzhou (CN); Fenglei Li, Guangzhou (CN); Min Sun, Guangzhou (CN); Xiangjian Zeng, Guangzhou (CN); Na Lan, Guangzhou (CN); Yumei Huang, Guangzhou (CN)

(73) Assignee: Guangzhou Joyson Cleaning Products Co., Ltd., Guangzhou (CN)

( * ) Notice: Subject to any disclaimer, the term of this patent is extended or adjusted under 35 U.S.C. 154(b) by 365 days.

(21) Appl. No.: 18/503,329

(22) Filed: Nov. 7, 2023

(65) Prior Publication Data

US 2025/0066698 A1 Feb. 27, 2025

Related U.S. Application Data

(63) Continuation of application No. PCT/CN2023/115112, filed on Aug. 26, 2023.

(51) Int. Cl.

| | |
|---|---|
| ***C11D 3/00*** | (2006.01) |
| ***C11D 1/12*** | (2006.01) |
| ***C11D 1/28*** | (2006.01) |
| ***C11D 1/66*** | (2006.01) |
| ***C11D 1/72*** | (2006.01) |
| ***C11D 1/831*** | (2006.01) |
| ***C11D 3/20*** | (2006.01) |
| ***C11D 3/22*** | (2006.01) |
| ***C11D 3/33*** | (2006.01) |
| ***C11D 3/37*** | (2006.01) |
| ***C11D 3/386*** | (2006.01) |
| ***C11D 17/00*** | (2006.01) |

(52) U.S. Cl.

CPC ............ *C11D 17/0047* (2013.01); *C11D 1/12* (2013.01); *C11D 1/28* (2013.01); *C11D 1/662* (2013.01); *C11D 1/721* (2013.01); *C11D 1/831* (2013.01); *C11D 3/001* (2013.01); *C11D 3/2048* (2013.01); *C11D 3/2065* (2013.01); *C11D 3/2082* (2013.01); *C11D 3/225* (2013.01); *C11D 3/33* (2013.01); *C11D 3/3753* (2013.01); *C11D 3/3757* (2013.01); *C11D 3/38636* (2013.01); *C11D 2111/14* (2024.01)

(58) Field of Classification Search

CPC ......... C11D 17/0047; C11D 1/12; C11D 1/28; C11D 1/662; C11D 1/721; C11D 1/831; C11D 3/001; C11D 3/2048; C11D 3/2065; C11D 3/2082; C11D 3/225; C11D 3/33; C11D 3/3753; C11D 3/3757; C11D 3/38636; C11D 2111/14; C11D 17/0091; C11D 1/83; C11D 3/386; C11D 3/0021; C11D 3/222

USPC .......................................................... 510/224

See application file for complete search history.

(56) References Cited

U.S. PATENT DOCUMENTS

| | | | | |
|---|---|---|---|---|
| 11,674,112 B1 | 6/2023 | Sun et al. | | |
| 2019/0161707 A1* | 5/2019 | Vejborg | ............... | C12N 9/2402 |
| 2021/0261885 A1 | 8/2021 | Tibbs et al. | | |
| 2023/0212480 A1* | 7/2023 | Sun | ...................... | C11D 3/3753 510/446 |

FOREIGN PATENT DOCUMENTS

| | | | | | |
|---|---|---|---|---|---|
| CN | 106336958 A | | 1/2017 | | |
| CN | 108774615 A | | 11/2018 | | |
| CN | 111394206 A | | 7/2020 | | |
| CN | 114395448 A | * | 4/2022 | ......... | C11D 17/0078 |
| CN | 114395450 A | | 4/2022 | | |
| CN | 116194562 A | | 5/2023 | | |
| PH | 1200650158 B1 | * | 7/2011 | ............... | C11D 3/37 |
| WO | WO 0042157 A1 | * | 7/2000 | ........... | C11D 3/1273 |
| WO | WO 0220708 A1 | * | 3/2002 | ........... | C11D 3/3757 |
| WO | WO 2015054564 A1 | * | 4/2015 | ......... | C11D 17/0073 |

OTHER PUBLICATIONS

International Search Report cited in PCT/CN2023/115112, mailed Nov. 16, 2023.

Xiao Jinxin. "Key ingredients and related physical and chemical processes of special detergent formulas for automatic dishwashers" Daily Chemical Science, vol. 43, Issue 3, Mar. 31, 2020 (Mar. 31, 2020), pp. 8-14.

Ming Jiangbo. "Process development of instant tablet detergent" China Detergent Industry, Issue 8, Aug. 31, 2013 (Aug. 31, 2013), pp. 59-61.

Supplementary European Search Report received in corresponding European patent application No. 23798071.9, dated Feb. 11, 2025, 5 pages.

Zhao Yumei, et al.; "National Standards of the People's Republic of China"; GB 9985-2000; Wash tableware with detergent; Detergents for hand dishwashing; part 1: general rules; Nov. 21, 2000; 48 Pgs.

* cited by examiner

*Primary Examiner* — Eisa B Elhilo

(74) *Attorney, Agent, or Firm* — Cooper Legal Group, LLC

(57) ABSTRACT

The present application provides a tableware detergent tablet, and methods for preparing and using the same, the tableware detergent tablet is made of the following components in parts by mass: water-soluble polymer 15-35 parts, anionic surfactant 10-25 parts, nonionic surfactant 5-20 parts, forming additive 0.3-5 parts, polyol detergency promoter 1-10 parts, water softener 1-10 parts, anti-stain dispersant 1-10 parts, enzyme formulation 0.1-5 parts, polymer cleaning co-agent 0.3-3 parts, essence 0-1 part, and preservative 0-1 part.

9 Claims, No Drawings

TABLEWARE DETERGENT TABLET, AND METHODS FOR PREPARING AND USING THE SAME

CROSS-REFERENCE TO RELATED APPLICATION

This application is a continuation of international PCT application serial no. PCT/CN2023/115112, filed on Aug. 26, 2023. The entirety of international PCT application serial no. PCT/CN2023/115112 is hereby incorporated by reference herein and made a part of this specification.

TECHNICAL FIELD

The present application relates to a technical field of daily detergent, in particular, to a tableware detergent tablet and methods for preparing and using the same.

BACKGROUND ART

Household appliances are more and more popular in people's daily life with improving living standards. For example, dishwasher equipment has gradually become a good assistant for many consumers to free their hands. At present, the proportion of dishwashers in Europe and America is more than 90%, the proportion of dishwashers in China market is also expanding, and the tableware cleaning equipment such as dishwasher is becoming one of the family necessities.

At present, the detergents for dishwasher in the market mainly include dishwashing blocks. The dishwashing blocks are mainly made of alkaline inorganic salt and a small amount of anionic surfactant, and formed by stamping via a die. The dishwashing blocks are put into the cabin of dishwasher for routine washing when in use. However, if a large amount of surfactant is added in the dishwashing block, a phenomenon of sticking to the die during the preparation process can arise, resulting in a molding failure, such that the dishwashing blocks cannot be produced on a large-scale. A large amount of inorganic salt often needs to be added to facilitate the molding, so the content of effective active substance is usually low. The addition of a large amount of inorganic salts plays a role in neutralizing artificial dirt during washing, and then the stains can be removed together with the water pressure cleaning of the dishwasher, but the inorganic salt has no obvious cleaning effect on stubborn stains. Moreover, the use of a large amount of inorganic salts will also cause a waste of mining resources.

Recently, dishwashing beads wrapped with polyvinyl alcohol water-soluble film have appeared in the market, in which the surfactant with less foam is wrapped with a water-soluble film, and is utilized to wash the tableware. However, the surfactants in the dishwashing beads are only wrapped by a layer of water-soluble film, so there is a certain risk of leakage during the transportation and storage process, especially in the environment with high temperature and high humidity, the risk of leakage increases.

The most common liquid detergent in the market mainly include water as matrix in combination with surfactant. When it is poured into the cabin of the dishwasher, the phenomenon of leakage, such as liquid leakage, may appears. Meanwhile, using a large amount of water as matrix will result in a waste of water resource.

Generally, a large amount of anionic surfactants need to be added to the solid detergent tablet products in the market, so as to achieve a good emulsification effect on the water-soluble polymer polyvinyl alcohol carrier, and further ensure that the slurry can be molded to be tablet better, which is beneficial to volume production. However, a large amount of foam will be generated with the addition of a large amount of anionic surfactant during washing. For dishwashing cleaning, it is not only difficult to rinse well when washing, but also results in the phenomenon that foam overflows the equipment, which brings troubles to consumers and even risk of damaging the equipment, so there is still a space for improvement.

SUMMARY

Based on the above technical problems, the present application provides a tableware detergent tablet, and methods for preparing and using the same. The tableware detergent tablet has a good cleaning effect, less usage amount, low foam, convenience for volume production, easy storage and transportation, and no-plastic packaging.

In a first aspect, the present application provides a tableware detergent tablet, which adopts the following technical solution:

a tableware detergent tablet, the tableware detergent tablet is made of the following components in parts by mass: water-soluble polymer of low molecular weight 15-35 parts, anionic surfactant 10-25 parts, nonionic surfactant 5-20 parts, forming additive 0.3-5 parts, polyol detergency promoter 1-10 parts, water softener 1-10 parts, anti-stain dispersant 1-10 parts, enzyme formulation 0.1-5 parts, polymer cleaning co-agent 0.3-3 parts, essence 0-1 part, and preservative 0-1 part.

In the present application, the water-soluble polymer of low molecular weight is selected as a film-forming agent, combined with a small amount of anionic surfactant, so that a good emulsification effect is obtained, an excellent decontamination and cleaning effect are achieved, and the amount of foam produced during washing can also be reduced. Moreover, the water-soluble polymer of low molecular weight is selected, which is beneficial to the addition of more nonionic surfactants, and a foam suppression to the anionic surfactant during the washing and cleaning process is produced, achieving the effects of less usage amount of the anionic surfactant, low foam, strong detergency. Meanwhile, the tablet is easy to be kept dry and then to meet the requirement of no-plastic packaging.

In some embodiments, the water-soluble polymer is polyvinyl alcohol and/or polyvinyl alcohol cross-linked polymer, and has an average molecular weight of 10000-40000.

In some embodiments, the anionic surfactant is at least one selected from the group consisting of alkyl sulfate, alkyl polyether sulfate, fatty acid methyl ester sulfonate, fatty acid methyl ester ethoxylate sulfonate, modified oil ethoxylate sulfonate, and alcohol ether carboxylate, each of which has a C8-C22 carbon chain, and/or any combination thereof.

In some embodiments, the anionic surfactant is at least one selected from the group consisting of sodium alkyl sulfate, potassium alkyl sulfate, sodium alkyl benzene sulfonate, sodium alpha-alkenyl sulfonate, sodium alkyl polyether sulfate, sodium fatty acid methyl ester ethoxylate sulfonate, sodium modified oil ethoxylate sulfonate, and sodium fatty acid methyl ester sulfonate, and/or any combination thereof.

In some embodiments, the nonionic surfactant is at least one selected from the group consisting of alkyl glycoside, polymer of maltitol laurate and maltooligosaccharide glucoside, alcohol ether glycoside, fatty alcohol polyoxyethylene ether, isomeric alcohol polyoxyethylene ether, EO-PO block polyoxyethylene ether, modified oil ethoxylate and fatty acid methyl ester ethoxylate, each of which has a C6-C18 carbon chain.

In some embodiments, the nonionic surfactant is a combination of at least one of alkyl glycoside, and polymer of maltitol laurate and maltooligosaccharide glucoside, each of which has a C6-C18 carbon chain, and any other nonionic surfactants selected from the group consisting of alcohol ether glycoside, fatty alcohol polyoxyethylene ether, isomeric alcohol polyoxyethylene ether, EO-PO block polyoxyethylene ether, modified oil ethoxylate and fatty acid methyl ester ethoxylate, each of which has a C6-C18 carbon chain.

In some embodiments, the forming additive is at least one selected from the group consisting of carboxymethyl cellulose, polyanionic cellulose, hydroxypropyl methylcellulose and hydroxyethyl cellulose.

In some embodiments, the water softener is at least one selected from the group consisting of ethydiaminedhephen acetic sodium, sodium/potassium tripolyphosphate, sodium citrate, sodium hydroxyethylidene diphosphate, tetrasodium glutamate diacetate, trisodium methylglycine diacetate, sodium iminodisuccinate, sodium polyaspartate and sodium polyepoxysuccinate.

In some embodiments, the anti-stain dispersant is at least one selected from the group consisting of sodium salt of copolymer of maleic acid and acrylic acid, hydrophobically modified acrylic polymer, acrylic homopolymer, copolymer of acrylic acid and sulfonic acid, and sodium/potassium polyacrylate.

In some embodiments, the enzyme formulation is at least one selected from the group consisting of protease, amylase, lipase, mannanase, cellulase, pectin lyase, oxidoreductase, and glycoside hydrolase.

In some embodiments, the water-soluble polymer has an average molecular weight of 15000-32000.

In some embodiments, the water softener is a combination of trisodium methylglycine diacetate and sodium citrate in a mass ratio of 3:(1-3).

In some embodiments, the anti-stain dispersant is a combination of sodium polyacrylate and copolymer of acrylic acid and sulfonic acid in a mass ratio of 3:(1-3).

In some embodiments, the polyol detergency promoter is at least one selected from the group consisting of glycerol, ethylene glycol, propylene glycol, pentanediol, and hexanediol.

In some embodiments, the enzyme formulation is liquid-type enzyme formulation or solid phase enzyme formulation.

In some embodiments, the enzyme formulation is a combination of protease, amylase, and mannanase in a mass ratio of 3:(1-3):0.5.

In a second aspect, the present application provides a method for preparing a tableware detergent tablet, which adopts the following technical solution:

a method for preparing the tableware detergent tablet, including:

(1) adding water into a reaction kettle, heating to 50-60° C., stirring homogeneously, adding the water-soluble polymer, stirring continuously and heating to 80-90° C. until the water-soluble polymer is completely dissolved;

(2) adding the anionic surfactant, the nonionic surfactant, the polyol detergency promoter, the anti-stain dispersant, the water softener, and the polymer cleaning co-agent successively under stirring for being dissolved homogeneously;

(3) adding a mixture of the forming additive and an appropriate amount of water into the reaction kettle, stirring homogeneously, adding remaining components of the tableware detergent tablet successively, and stirring homogeneously to obtain a stable slurry;

(4) conveying the stable slurry to a drying equipment, distributing a solid enzyme formulation in an undried slurry uniformly during a drying process, and drying continuously until the solid enzyme formulation is completely adhered to a dried tablet;

(5) demoulding and sectioning to obtain the tableware detergent tablet.

Or a method for preparing the tableware detergent tablet, including:

(1) adding water into a reaction kettle, heating to 50-60° C., stirring homogeneously, adding the water-soluble polymer, stirring continuously and heating to 80-90° C. until the water-soluble polymer is completely dissolved;

(2) adding the anionic surfactant, the nonionic surfactant, the polyol detergency promoter, the anti-stain dispersant, the water softener, and the polymer cleaning co-agent successively under stirring for being dissolved homogeneously;

(3) adding a mixture of the forming additive and an appropriate amount of water into the reaction kettle, stirring homogeneously, adding remaining components of the tableware detergent tablet successively, and stirring homogeneously to obtain a stable slurry;

(4) conveying the stable slurry to a drying equipment through a pipe transportation equipment, drying to obtain a tablet;

(5) distributing a liquid enzyme formulation uniformly on a dried tablet through painting or spraying, and then sectioning into different sizes, to obtain the tableware detergent tablet.

In a third aspect, the present application provides a method for using the tableware detergent tablet, which adopts the following technical solution:

a method for using the tableware detergent tablet, including putting the tableware detergent tablet into a cabin, or a dish basket of a dishwasher, or on a tableware, or besides a sink at the bottom of the dishwasher for washing; or dissolving and diluting the tableware detergent tablet with appropriate amount of water to aqueous solution with different concentrations, and then performing a conventional manual-washing.

The tableware detergent tablet of the present application need not to be put into the cabin of the dishwasher, but can be directly put into the dish basket of the dishwasher, or be put on the tableware, or be put besides the sink at the bottom of the dishwasher, which is convenient to use. The dishwasher need not to be performed a pre-washing mode, but an energy-saving mode can be directly started, which can also play a good washing and cleaning effect and save energy consumption. The tableware detergent tablet can use no-plastic packaging, which is environmentally friendly. The tableware detergent tablet can also be mixed with appropriate amount of water to prepare aqueous solution with different concentrations, for conventional manual-washing, which is convenient and practical.

In summary, the present application can achieve the following beneficial technical effects:

1. in the present application, polyvinyl alcohol and/or polyvinyl alcohol cross-linked polymer of low molecular weight are selected as film-forming agents, and a small amount of anionic surfactant is compounded in a proper proportion, which is beneficial to prepare a tableware detergent tablet with excellent cleaning and decontamination effects. Meanwhile polyvinyl alcohol and/or polyvinyl alcohol cross-linked polymer of low molecular weight are selected, which is beneficial to the addition of larger amount of nonionic surfactant, improving the detergency of the tableware detergent tablet. A foam suppression to the anionic surfactant during the washing and cleaning process is produced, which is further beneficial to avoiding the generation of a large amount of foam during washing, and achieving the effects of less usage amount of the tableware detergent tablet and a strong detergency. Meanwhile, the tablet is easy to be kept dry and then to meet the requirement of no-plastic packaging.

2. polyvinyl alcohol and/or polyvinyl alcohol cross-linked polymer of low molecular weight are selected, which facilitates the addition of solid enzyme formulation in a tablet preparation process, so that the solid enzyme formulation can be attached to the tableware detergent tablet more easily and stably, and is not easy to fall off the tableware detergent tablet. Therefore, the detergency of the tableware detergent tablet is improved, and a better decontamination effect can be achieved with a small amount of the tableware detergent tablet.

3. In the present application, the anionic surfactant is preferably a composition of sodium alkyl sulfate and sodium fatty acid methyl ester sulfonate in a mass ratio of 10:(1-6). The nonionic surfactant is preferably a combination of at least one of alkyl glycoside, maltitol laurate and maltooligosaccharide glucoside polymer with any other nonionic surfactants. The water softener is preferably a composition of trisodium methylglycine diacetate and sodium citrate in a mass ratio of 3:(1-3). The anti-stain dispersant is preferably a combination of sodium polyacrylate and copolymer of acrylic acid and sulfonic acid in a mass ratio of 3:(1-3). The polyol detergency promoter is preferably any combination of glycerol and/or propylene glycol with any other polyol detergency promoters, more preferably any combination of glycerol with any other polyol detergency promoters in a mass ratio of 2:(1-2). The enzyme formulation is preferably a combination of protease, amylase and mannase in a mass ratio of 3:(1-3):0.5.

DETAILED DESCRIPTION

In order to clearly describe the invention purpose, technical solution and beneficial technical effect of the present application clearer, the present application will be described in detail below. It should be noted that the various aspects, features, embodiments, and advantages described in this application can be compatible and/or combined.

Unless otherwise specified, the meanings of technical terms in the specification are the same as those commonly understood by those skilled in the art.

The source of the raw materials involved in the present application are described as follows, polyvinyl alcohol can be series products of low molecular weight, such as BP-05, available from changchun company, Taiwan, China, PVA-205 or PVA-203, available from kuraray company, Japan; nonionic surfactant fatty alcohol polyoxyethylene ether may be alcohol ethoxylate, such as Lutensol A 7N/9N, etc., available from BASF; nonionic surfactant alkyl glycoside may be Glucopon® APG series products, such as Glucopon 215 UP, Glucopon 650EC, etc., available from BASF; nonionic surfactant isomeric alcohol polyoxyethylene ether may be lutensol XP series products, such as XP30, XP40, XP50, etc., available from BASF; water softener trisodium methylglycine diacetate can be Trilon M, TrilonUltimate series products; tetrasodium glutamate diacetate can be Dissolvine GL-47-S, available from Nouryon; sodium iminodisuccinate can be IDS42, available from Shandong Yuanlian Chemical Co., Ltd.; EO-PO block polyoxyethylene ether can be HIG series products such as HIG6100, HIG6200, etc., available from Jiangsu Lianhong technology Co., Ltd.; hydroxyethyl cellulose can be Natrosol™ 250 hhr, available from Ashland company; modified grease ethoxylate and fatty acid methyl ester ethoxylate can be series products SOE-C-60 and FMEE, respectively, available from China Research Institute of Daily Chemical Industry; liquid enzyme formulation can be Progress Uno series enzyme formulation products available from Novozymes company, such as Progress Uno 100L proteinase, liquid amylase (SuhongAAll 2X), liquid mannase enzyme (annaway 4.0L), etc; solid enzyme formulation can be Mannaway series 4.0T solid mannase, amylase (Stainzyme Plus Evity 12T), and protease Savinase series (Savinase 4.0T/Savinase6.0T/Savinase 8.0T/Savinase 24T, etc., from Novozymes company; anti-stain dispersant can be ACUSOL™445NG Polymer acrylic homopolymer, copolymer of acrylic acid and sulfonic acid, ACUSOL™588G Polymer, available from DOW company; sodium salt of copolymer of maleic acid and acrylic acid can be Sokalan CP 5, Sokalan CP 5 Granules series products, available from BASF; polymer cleaning co-agent can be a polymer of 1-aminopropane, N,N,N-trimethyl-3-((2-methyl-1-oxo-2-propenyl)amino)-chloride, ethyl-acrylate and sodium polyacrylate, REWOCARE 755, available from Evonik Specialty Chemicals; maltitol laurate and maltooligosaccharide glucoside polymer can be PG68, available from Guangzhou Qianyan New Materials Development Co., Ltd.

In recent years, the emerging tablet products are becoming more and more popular among consumers, however, conventional tablet detergents usually need to be added a large amount of anionic surfactants, such as sodium dodecyl sulfate, sodium alpha-olefin sulfonate, such that a large amount of foam was produced when the products are used, and a large amount of foam will spill over dishwasher equipment when dishwashing, which brings many troubles to consumers, and even risks of damaging the equipment.

In the present application, polyvinyl alcohol and/or polyvinyl alcohol cross-linked polymer of low molecular weight are selected, and a small amount of anionic surfactant is compounded in a proper proportion, which is beneficial to a good emulsification of the anionic surfactants, so that the tableware detergent tablet product has a good decontamination and cleaning effect, and the rinsing difficulty is reduced. Secondly, polyvinyl alcohol of low molecular weight is added in a large amount, which is beneficial to adding larger amount of nonionic surfactant and water softener, so that the product is kept dry and meets the requirements of no-plastic packaging, while improving the cleaning and detergency of the product. Moreover, a large amount of foam during washing is avoided, so that a less usage amount of the tableware detergent tablet and a strong detergency are achieved. Thirdly, polyvinyl alcohol and/or polyvinyl alcohol cross-linked polymer of low molecular weight are selected, which facilitates the addition of solid enzyme formulation in a tablet preparation process, so that the solid enzyme formulation can be attached to the tableware detergent tablet more easily and stably, and is not easy to fall off the tableware detergent tablet. Therefore, the detergency of the tableware detergent tablet is improved, and a better decontamination effect can be achieved with a small amount of the tableware detergent tablet.

The present application relates to a tableware detergent tablet, and methods for preparing and using the same.

The present application will be described in detail hereinafter.

In a first aspect, the present application provides a tableware detergent tablet, which adopts the following technical solution:

a tableware detergent tablet, the tableware detergent tablet is made of the following components in parts by mass: water-soluble polymer of low molecular weight 15-35 parts, anionic surfactant 10-25 parts, nonionic surfactant 5-20 parts, forming additive 0.3-5 parts, polyol detergency promoter 1-10 parts, water softener 1-10 parts, anti-stain dispersant 1-10 parts, enzyme formulation 0.1-5 parts, polymer cleaning co-agent 0.3-3 parts, essence 0-1 part, and preservative 0-1 part.

In some embodiments, the water-soluble polymer can be polyvinyl alcohol and/or polyvinyl alcohol cross-linked polymer, the polyvinyl alcohol has an average polymerization degree of 250-650, an average molecular weight of 10000-40000, and an alcoholysis degree of 86%-89%. Preferably, the polyvinyl alcohol has an average molecular weight of 15000-32000; as an example, the polyvinyl alcohol has an average molecular weight of 12000, 13000, 14000, 15000, 16000, 17000, 18000, 19000, 20000, 22000, 25000, 27000, 30000 and 32000 or within a range between any two of the above numerical values.

In some embodiments, the anionic surfactant is at least one selected from the group consisting of alkyl sulfate, alkyl polyether sulfate, fatty acid methyl ester sulfonate, fatty acid methyl ester ethoxylate sulfonate, modified oil ethoxylate sulfonate, alcohol ether carboxylate, each of which has a C8-C22 carbon chain, and/or any combination thereof; optionally, at least one of sodium alkyl sulfate, potassium alkyl sulfate, sodium alkyl benzene sulfonate, sodium alpha-alkenyl sulfonate, sodium alkyl polyether sulfate, sodium fatty acid methyl ester ethoxylate sulfonate, sodium modified oil ethoxylate sulfonate, and sodium fatty acid methyl ester sulfonate, and/or any combination thereof; preferably, a combination of sodium alkyl sulfate and any other anionic surfactant described above, with fatty acid methyl ester sulfonate in a mass ratio of 10:(1-6); more preferably, a combination of sodium alkyl sulfate with fatty acid methyl ester sulfonate in a mass ratio of 10:(1-6).

In some embodiments, the nonionic surfactant is at least one selected from the group consisting of alkyl glycoside, polymer of maltitol laurate and maltooligosaccharide glucoside polymer, alcohol ether glycoside, fatty alcohol polyoxyethylene ether, isomeric alcohol polyoxyethylene ether, EO-PO block polyoxyethylene ether, modified oil ethoxylate and fatty acid methyl ester ethoxylate, each of which has a C6-C18 carbon chain. Preferably, the nonionic surfactant is a combination of at least one of alkyl glycoside, and polymer of maltitol laurate and maltooligosaccharide glucoside, each of which has a C6-C18 carbon chain, and any other nonionic surfactants selected from the group consisting of alcohol ether glycoside, fatty alcohol polyoxyethylene ether, isomeric alcohol polyoxyethylene ether, EO-PO block polyoxyethylene ether, modified oil ethoxylate and fatty acid methyl ester ethoxylate, each of which has a C6-C18 carbon chain; more preferably, the nonionic surfactant is a combination of alkyl glycoside, and polymer of maltitol laurate and maltooligosaccharide glucoside, each of which has a C6-C18 carbon chain, and any other nonionic surfactants selected from the group consisting of alcohol ether glycoside, fatty alcohol polyoxyethylene ether, isomeric alcohol polyoxyethylene ether, EO-PO block polyoxyethylene ether, modified oil ethoxylate and fatty acid methyl ester ethoxylate, each of which has a C6-C18 carbon chain.

In some embodiments, the forming additive is polysaccharide fiber polymer, optionally, the forming additive is at least one selected from the group consisting of carboxymethyl cellulose, polyanionic cellulose, hydroxypropyl methylcellulose and hydroxyethyl cellulose; preferably, at least one of hydroxypropyl methylcellulose and hydroxyethyl cellulose.

In some embodiments, the water softener is at least one selected from the group consisting of ethydiaminedhephen acetic sodium, sodium/potassium tripolyphosphate, sodium citrate, sodium hydroxyethylidene diphosphate, tetrasodium glutamate diacetate, trisodium methylglycine diacetate, sodium iminodisuccinate, sodium polyaspartate and sodium polyepoxysuccinate; preferably, a combination of at least one of tetrasodium glutamate diacetate, trisodium methylglycine diacetate and sodium iminodisuccinate or any combination thereof, with sodium citrate in a mass ratio of 3:(1-3); more preferably, a combination of trisodium methylglycine diacetate and sodium citrate in a mass ratio of 3:(1-3).

In some embodiments, the anti-stain dispersant is at least one selected from the group consisting of sodium salt of copolymer of maleic acid and acrylic acid, hydrophobically modified acrylic polymer, acrylic homopolymer, copolymer of acrylic acid and sulfonic acid, sodium/potassium polyacrylate; preferably, the anti-stain dispersant is a combination of sodium polyacrylate and copolymer of acrylic acid and sulfonic acid in a mass ratio of 3:(1-3).

In some embodiments, the polyol detergency promoter is at least one selected from the group consisting of glycerol, ethylene glycol, propylene glycol, pentanediol, and hexanediol; preferably, the polyol detergency promoter is a combination of glycerol, propylene glycol and any other polyol detergency promoter selected from the group consisting of propylene glycol, pentanediol, and hexanediol; more preferably, the polyol detergency promoter is a combination of glycerol and any other polyol detergency promoter selected from the group consisting of ethylene glycol, propylene glycol, pentanediol, and hexanediol in a mass ratio of 2:(1-2).

In some embodiments, the enzyme formulation is at least one selected from the group consisting of protease, amylase, lipase, mannanase, cellulase, pectin lyase, oxidoreductase, and glycoside hydrolase; the enzyme formulation is any one of liquid-type, solid phase or granular-type enzyme formulation, or combination thereof, and the solid phase or granular-type enzyme formulation is prepared by any one of embedding method, chemical bonding method and physical adsorption method; preferably, the enzyme formulation is a combination of protease, amylase, and mannanase in a mass ratio of 3:(1-3):0.5.

In some embodiments, the polymer cleaning co-agent can be a polymer of N,N,N-trimethyl-3-((2-methyl-1-oxo-2-propenyl)amino)-chloride, 1-aminopropane, ethyl-acrylate and sodium polyacrylate (article number: REWOCARE 755, from Evonik Specialty Chemicals).

In some embodiments, the preservative can be at least one of Hydroxydichlorodiphenyl ether, methyl isothiazolinone and/or a combination thereof.

In some embodiments, the essence can be flavouring essence for daily.

EXAMPLES

In order to make the purpose, technical solution and advantages of the present application more clear, the present application will be further described in detail in combination with the examples. It should be understood that the specific examples described herein are only used to explain the present application, and are not used to limit the present application.

Examples 1-7

Example 1 is described as follows:

Example 1-a

The tableware detergent tablet of Example 1-a was prepared by the following method:

(1) adding water into a reaction kettle, heating to 50-60° C., stirring homogeneously stirring, adding polyvinyl alcohol, stirring continuously and heating to 80-90° C. until the polyvinyl alcohol is completely dissolved; (2) adding the anionic surfactant, the nonionic surfactant, the polyol detergency promoter, the anti-stain dispersant, the water softener, and the polymer cleaning co-agent successively under stirring for being dissolved homogeneously; (3) adding a mixture of the forming additive and an appropriate amount of water (2-3 times of the mass of the forming additive) into the reaction kettle, stirring homogeneously, adding remaining components of the tableware detergent tablet successively, and stirring homogeneously to obtain a stable slurry; (4) conveying the stable slurry to drying a drying equipment through a pipe transportation equipment, distributing a solid enzyme formulation in the an undried slurry uniformly during a drying process, and drying continuously until the solid enzyme formulation is completely adhered to a dried tablet; (5) demoulding and sectioning to obtain the tableware detergent tablet.

Example 1-b

The tableware detergent tablet of Example 1-b was prepared by the following method:

(1) adding water into a reaction kettle, heating to 50-60° C., stirring homogeneously stirring, adding polyvinyl alcohol, stirring continuously and heating to 80-90° C. until the polyvinyl alcohol is completely dissolved; (2) adding the anionic surfactant, the nonionic surfactant, the polyol detergency promoter, the anti-stain dispersant, the water softener, and the polymer cleaning co-agent successively under stirring for being dissolved homogeneously; (3) adding a mixture of the forming additive and an appropriate amount of water (2-3 times of the mass of the forming additive) into the reaction kettle, stirring homogeneously, adding remaining components of the tableware detergent tablet successively, and stirring homogeneously to obtain a stable slurry; (4) conveying the stable slurry to a drying equipment through a pipe transportation equipment, drying to obtain a tablet; (5) distributing a liquid enzyme formulation uniformly on a dried tablet through painting or spraying, and then sectioning into different sizes, to obtain the tableware detergent tablet.

TABLE 1 components and mass ratio of the tableware detergent tablets provided by Examples 1-7

| Material types | Materials | Examples 1 | 2 | 3 | 4 | 5 | 6 | 7 |
|---|---|---|---|---|---|---|---|---|
| Film-forming agents (kg) | Polyvinyl alcohol (BP-05) | 15 | 20 | 25 | / | 20 | / | 30 |
| | Polyvinyl alcohol (PVA-203) | / | / | / | 30 | 15 | 20 | / |
| C8-C22 anionic surfactants (kg) | Sodium alkyl sulfate | 10 | 10 | 14 | 16 | 18 | 8 | 15 |
| | Sodium fatty acid methyl ester sulfonate | 2 | 3 | 3.5 | 3.6 | 4 | 2 | 4 |
| | Sodium alpha-alkenyl sulfonate | / | 2 | / | / | / | / | |
| | Alkyl polyether sulfate | / | / | 2 | / | / | / | 2 |
| | Sodium fatty acid methyl ester ethoxylate sulfonate | / | / | / | 2 | / | / | 2 |
| | Modified oil ethoxylate sulfonate | / | / | / | / | 2 | / | 2 |
| C6-C18 nonionic surfactant (kg) | Alkyl glycoside | 12 | / | 14 | 15 | 18 | | 16 |
| | Polymer of maltitol laurate and maltooligosyl glucoside | / | 12 | / | / | 4 | 4 | / |
| | EO-PO block polyoxyethylene ether | / | / | 4 | / | / | | |
| | Fatty acid methyl ester ethoxylate | / | / | / | 5 | 3 | | 5 |
| | Fatty alcohol polyoxyethylene ether | 3 | 4 | / | / | / | 1 | |
| Forming additive (kg) | Hydroxyethyl cellulose | 3 | / | 1.5 | / | 1 | 3 | 0.3 |
| | Hydroxypropyl methylcellulose | / | 2 | / | 1 | / | 2 | / |
| Polyol detergency promoter (kg) | Propylene glycol | 1 | | 2 | / | 3 | 1 | / |
| | Glycerol | 2 | 2 | 2 | 2 | 2 | | 2 |
| | Pentanediol | / | / | | | 3 | | 2 |
| | Hexanediol | / | 1 | 1 | 1 | 2 | | / |
| Water softener (kg) | Trisodium methylglycine diacetate | 3 | / | 3 | / | 6 | 1 | 2 |
| | Sodium citrate | 1 | 1 | 2 | 2 | 4 | | 2 |
| | Tetrasodium glutamate diacetate | / | 3 | / | 3 | / | | 2 |

TABLE 1-continued components and mass ratio of the tableware detergent tablets provided by Examples 1-7

| Material types | Materials | Examples 1 | 2 | 3 | 4 | 5 | 6 | 7 |
|---|---|---|---|---|---|---|---|---|
| Anti-stain dispersant (kg) | Sodium polyacrylate | 3 | 2.5 | 2 | 1.5 | 5 | 1 | 2 |
| | Copolymer of acrylic acid and sulfonic acid | 1 | 1 | 2 | 1.5 | 5 | | 1 |
| Enzyme formulation (kg) | Proteinase | 3 | 3 | 3 | 3 | 3 | 3 | 3 |
| | Diastase | 1 | 1 | 1 | 1 | 1 | 1 | 1 |
| | Mannase | 0.5 | 0.5 | 0.5 | 0.5 | 0.5 | 0.5 | 0.5 |
| Polymer cleaning co-agent (kg) | REWOCARE 755 | 1 | 0.6 | 0.6 | 0.5 | 0.5 | 0.3 | 3 |
| Preservative (kg) | Hydroxydichlorodiphenyl ether | 0.1 | | 0.05 | 0.05 | 0.05 | 0.05 | 0.05 |
| | Methyl isothiazolinone | | 0.1 | 0.05 | 0.05 | 0.05 | 0.05 | 0.05 |
| Flavouring essence (kg) | / | 0.5 | 0.5 | 0.5 | 0.5 | 0.5 | 0.5 | 0.5 |
| DI water (kg) | | 40 | 50 | 62.5 | 75 | 87.5 | 50 | 75 |

Example 8

The tableware detergent tablet of this example was same as that of Example 1-a, except that the anionic surfactant was 10 kg of sodium alkyl sulfate, and 0.5 kg of fatty acid methyl ester sulfonate.

Example 9

The tableware detergent tablet of this example was same as that of Example 1-a, except that the nonionic surfactant was 12 kg of EO-PO block polyoxyethylene ether and 3 kg of fatty acid methyl ester ethoxylate.

Example 10

The tableware detergent tablet of this example was same as that of Example 1-a, except that the water softener was 3 kg of sodium ethylenediamine di-o-phenylacetate and 1 kg of sodium citrate.

Example 11

The tableware detergent tablet of this example was same as that of Example 1-a, except that the anti-stain dispersant was 5 kg of sodium polyacrylate and 1 kg of copolymer of acrylic acid and sulfonic acid.

Comparative Example 1

The tableware detergent tablet of this comparative example was same as that of Example 1-a, except that the polyvinyl alcohol in this comparative example was BP-17, with an average molecular weight of 84000-89000. In this comparative example, a low addition amount of anionic surfactant was still adopted.

Comparative Example 2

The tableware detergent tablet of this comparative example was same as that of Example 1-a, except that the polyvinyl alcohol and anionic surfactant were different, the polyvinyl alcohol in this comparative example was BP-17, with an average molecular weight of 84000-89000, the anionic surfactant in this comparative example was 15 kg of sodium alkyl sulfate and 5 kg of sodium alpha-alkenyl sulfonate.

Comparative Example 3

A commercially available 3-chamber dishwashing beads was used in this comparative example.

Test Items and Methods:

I Testing of Detergency:

1. Preparation of Mixed Oil:

Butter, lard, and vegetable oil were mixed in a mass ratio of 0.5:0.5:1, and 5% of glycerin monostearate, based on the total amount of the mixed oil, was added, to obtain an artificial dirt. The artificial dirt has a shelf life of 6 months in a refrigerator;

The artificial dirt is heated to 180° C. in an electric furnace, and the temperature is kept for 10 min under stirring, the beaker containing the artificial dirt was transferred to an electromagnetic stirrer for stirring, and naturally cooled to the required temperature for later use. Recommended painting temperature were as follows:

when the room temperature is 20° C., the oil temperature needs to be 80° C.; when the room temperature is 25° C., the oil temperature needs to be 45° C.; when the room temperature is lower than 17° C. or higher than 27° C., the test is not suitable. If necessary, a vertical decontamination machine with a freezing device should be used.

2. Preparation of a Smeared Slide:

A 10 mm of line was drawn along the upper edge of the glass slide, to show that the dirt is painted below the line; a 5 mm of line was drawn along the lower edge of the glass slide to show that the excess oil is wiped below the line;

Newly-purchased glass slides need to be boiled in a detergent solution for 15 min, washed with clean water until water drops do not hang, soaked in an acid solution for 1 hour, rinsed with clean water and distilled water, and dried in a drying oven for later use.

3. Preparation of Standard Tableware Detergent:

14 parts of sodium alkyl benzene sulfonate, 1 part of sodium ethoxylated alkyl sulfate, 5 parts of absolute ethyl alcohol, 5 parts of urea were weighted and mixed, water was added to 100 parts, to obtain the standard tableware detergent (the total weight of the standard tableware detergent was 100 parts). The pH of the standard tableware detergent was adjusted to 7-8 with hydrochloric acid or sodium hydroxide for later use.

4. Painting the Artificial Dirt:

The clean glass slides in groups of four were placed on the weighing rack, and accurately weighted with an analytical balance (accurate to 1 mg), denoted as m0, the weighted glass slides were clamped on a drying rack one by one with chips, at a position on the upper edge line of the glass slide, the drying rack was put in an enamel disc for painting artificial dirt.

After the artificial dirt was kept at a required temperature, the glass slides together with the clips were taken off from the drying rack one by one, and the glass slides were immersed in the artificial dirt for 1-2 seconds below the upper edge line of 10 mm by holding the clips, and then slowly taken out. After the dripping speed of the artificial dirt slowed down, the glass slides were hung back on the drying rack to prepare the smeared slide in turn; after the artificial dirt was solidified, the smeared slides were taken off the drying rack, the excess artificial dirt within 5 mm from the bottom edge and the artificial dirt at both sides of the smeared slide were wiped off with filter paper or absorbent cotton, then with absorbent cotton stained with petroleum ether, the absorbent cotton stained with petroleum ether was clamped by a tweezer; after drying in the air for 4 hours at the room temperature, the smeared slides were accurately weighed with analytical balance on the weighing rack, denoted as ml, the content of artificial dirt on the smeared slide of each group should be guaranteed to be (0.5±0.05) g.

5. Test Procedure

The glass slides that had known amount of artificial dirt were inserted into a washing rack for washing;

The decontamination machine was powered on, the washing temperature was set to be 30° C., the slewing speed was set to be 160 r/min, and the washing time was set to be 3 min;

5.00 g of samples to be tested was weighted and added into 2500 mL of 250 mg/L hard water. After shaking well, a test liquid was obtained. 800 mL of test liquid were added to three washing bucket of the vertical decontamination machine, respectively. When the temperature of the test liquid was heated to 30° C., the smeared slides that had known amount of artificial dirt together with the washing rack were put into the corresponding washing bucket rapidly. After all the washing racks were put into the washing buckets, the soaking time was started to be calculated. At the same time, a blender was rapidly installed. When the soaking time was 1 min, the decontamination machine was started, and washing was started. After washing for 3 min, the decontamination machine is powered off automatically, the blender was removed rapidly, and the washing rack was taken out, and the washed smeared slides were clamped on the drying rack one by one. After being hung for 3 h, the smeared slides were weighed, denoted as m2.

6. Matters Needing Attention:

(1) each batch of test were standard, three groups of smeared slides were prepared for tableware detergent, and three groups of smeared slides were prepared for each sample to be tested;

(2) the test results of degreasing rate will be affected due to the difference of painting conditions, therefore, no matter how many samples were tested for the same batch of smeared glass slide, three groups of standard tableware detergents must be tested for comparison.

7. Calculation:

$$\text{degreasing rate}(\%) = \frac{m1 - m2}{m1 - m0} \times 100\%$$

in above formula: m0 is the mass of the glass slide before painting the artificial dirt;

m1 is the mass of the glass slide after painting the artificial dirt; and m2 is the mass of the smeared slide after washing.

8. Judgement of Test Result:

If the degreasing rate of the tested tableware detergent is not less than that of the standard tableware detergent, the detergency of the tableware detergent is judged as qualified, otherwise as unqualified.

II. Washing Test:

1. Two sets of 24 bowls (including porcelain bowls/plates, plastic bowls/stainless steel bowls/plates, cups, chopsticks/spoons, etc.) were prepared in advance. One set of the bowls were coated with about 8 g of mixed oil and then cleaned; the other set of bowls were used to observe the cleanliness after washing. Specifically, the two sets of 24 bowls included 12 porcelain plates, 2 plastic bowls, 2 stainless steel bowls, 12 porcelain bowls, 10 glass cups, 6 stainless steel spoons and 4 pairs of stainless steel chopsticks.

2. The preparation of mixed oil:

60% edible oil, 5% butter, 5% whipped cream, 4% peanut butter, 3% barbecue sauce, 2% cheese, 2% red wine, 5% salad dressing, 8% soy sauce, 2% jam, 1% tomato sauce, 1% chocolate, 1% % chili oil and 1% sesame oil were mixed uniformly for later use.

3. One piece of tableware detergent tablet was put into the dishwashing trough (tableware detergent tablet)/dishwasher, and daily mode washing was performed for 59 min, and the cleanliness after washing and whether there is foam overflowing were observed;

4. Dishwasher model: Haier EW130266BKD.

Operation Process:

1. a 4 g sample of tableware detergent tablet was put into the dish basket of the dishwasher, and a daily washing mode was performed for 59 min;

2. a commercially available 3-chamber dishwashing bead was put into the cabin of the dishwasher, the cabin of dishwasher was closed, and a strong washing mode washing was performed for 120 min.

TABLE 2 test results of detergency of Examples 1 to 7, Examples 10 to 11 and Comparative examples 1 to 3

| | Test concentration % | Test results % | Judgment of test results |
|---|---|---|---|
| Standard detergent | 0.2 | 46.9 | / |
| Example 1-a (tableware detergent tablet added with solid enzyme) | 0.067 (concentrated about 3 times) | 51.6 | Qualified |
| Example 1-b (tableware detergent tablet added with liquid enzyme) | 0.067 (concentrated about 3 times) | 50.6 | Qualified |
| Example 2-a (tableware detergent tablet added with solid enzyme) | 0.1 (concentrated about 2 times) | 69.7 | Qualified |
| Example 2-b (tableware detergent tablet added with liquid enzyme) | 0.1 (concentrated about 2 times) | 68.2 | Qualified |

TABLE 2-continued test results of detergency of Examples 1 to 7, Examples 10 to 11 and Comparative examples 1 to 3

| | Test concentration % | Test results % | Judgment of test results |
|---|---|---|---|
| Example 3-a (tableware detergent tablet added with solid enzyme) | 0.067 (concentrated about 3 times) | 51.6 | Qualified |
| Example 3-b (tableware detergent tablet added with liquid enzyme) | 0.067 (concentrated about 3 times) | 50.6 | Qualified |
| Example 4-a (tableware detergent tablet added with solid enzyme) | 0.067 (concentrated about 3 times) | 51.6 | Qualified |
| Example 4-b (tableware detergent tablet added with liquid enzyme) | 0.067 (concentrated about 3 times) | 50.6 | Qualified |
| Example 5-a (tableware detergent tablet added with solid enzyme) | 0.1 (concentrated about 2 times | 69.7 | Qualified |
| Example 5-b (tableware detergent tablet added with liquid enzyme) | 0.1 (concentrated about 2 times | 68.2 | Qualified |
| Example 6 | 0.067 (concentrated about 3 times) | 50.4 | Qualified |
| Example 7 | 0.067 (concentrated about 3 times) | 51.3 | Qualified |
| Example 10 | 0.067 (concentrated about 3 times) | 50.8 | Qualified |
| Example 11 | 0.067 (concentrated about 3 times) | 50.6 | Qualified |
| Comparative example 1 | 0.067 | 45.3 | Unqualified |
| Comparative example 2 | 0.067 (concentrated about 3 times) | 50.2 | Qualified |
| Comparative example 3 | 0.067 | 0.7 | Unqualified |

TABLE 3 test results of washing test of example 1 to 9

| | Sample weight | Washing time | Clean-liness | Residual foam | Dissolving capacity |
|---|---|---|---|---|---|
| Example 1-a (tableware detergent tablet added with solid enzyme) | 4 g | Daily washing 59 min | 99% | No residual foam | No residue in the dishwasher |
| Example 1-b (tableware detergent tablet added with liquid enzyme) | 4 g | 59 min | 99% | No residual foam | No residue in the dishwasher |
| Example 2-a (tableware detergent tablet added with solid enzyme) | 4 g | 59 min | 99% | No residual foam | No residue in the dishwasher |
| Example 2-b (tableware detergent tablet added with liquid enzyme) | 4 g | 59 min | 99% | No residual foam | No residue in the dishwasher |
| Example 3-a (tableware detergent tablet added with solid enzyme) | 4 g | 59 min | 99% | No residual foam | No residue in the dishwasher |
| Example 3-b (tableware detergent tablet added with liquid enzyme) | 4 g | 59 min | 99% | No residual foam | No residue in the dishwasher |
| Example 4-a (tableware detergent tablet added with solid enzyme) | 4 g | 59 min | 99% | No residual foam | No residue in the dishwasher |
| Example 4-b (tableware detergent tablet added with liquid enzyme) | 4 g | 59 min | 99% | No residual foam | No residue in the dishwasher |

TABLE 3-continued test results of washing test of example 1 to 9

| | Sample weight | Washing time | Clean-liness | Residual foam | Dissolving capacity |
|---|---|---|---|---|---|
| Example 5-a (tableware detergent tablet added with solid enzyme) | 4 g | 59 min | 99% | No residual foam | No residue in the dishwasher |
| Example 5-b (tableware detergent tablet added with liquid enzyme) | 4 g | 59 min | 99% | No residual foam | No residue in the dishwasher |
| Example 6 | 4 g | 59 min | 99% | No residual foam | No residue in the dishwasher |
| Example 7 | 4 g | 59 min | 99% | No residual foam | No residue in the dishwasher |
| Example 8 | 4 g | 59 min | 99% | Small amount of residual foam | No residue in the dishwasher |
| Example 9 | 4 g | 59 min | 99% | No residual foam | No residue in the dishwasher |
| Comparative example 1 | 4 g | 59 min | 80% | No residual foam | There is residue in the dishwasher |
| Comparative example 2 | 4 g | 59 min | 99% | Residual foam | No residue in the dishwasher |
| Comparative example 3 | About 19 g | Strong washing 118 min | 99% | No residual foam | No residue in the dishwasher |

Comparing the test results of Example 1 to 7, Comparative example 1 to 3, and referring to table 2, it can be seen that the degreasing rate of the tableware detergent tablet in the present application is higher than the degreasing rate of the standard detergent under the conditions of concentration 2 times and 3 times, which meets the standard GB/T 9985-2000 "Detergents for hand dishwashing". Referring to table 3, it can be seen that, under the conditions of less usage amount and shorter washing time, the cleanliness can reach nearly 100% and there is no residual foam, achieving the effect of less usage amount, strong detergency and saving water resources. This is because the polyvinyl alcohol of low molecular weight (the molecular weight is 27000-32000) is selected, and a small amount of anionic surfactant is added, by which a good emulsification effect can be achieved, so that a large amount of foam can be avoided when the tableware detergent tablet is used. Moreover, a greater amount of nonionic surfactants can be added in the formula, which is beneficial to the good decontamination and cleaning effect of the tableware detergent tablet, and is beneficial to the foam suppression of anionic surfactants, so as to avoid the generation of a large amount of foam during washing and thus realizing the characteristics of low foaming and strong detergency. However, in the tableware detergent tablet of Comparative example 1, the polyvinyl alcohol of high molecular weight is used, and the same amount of anionic surfactant as that of Example 1-a is added, the emulsification effect of the slurry becomes worse, and the viscosity of the slurry is high, which affects the tableting effect. After washing in daily washing mode (59 min) in the dishwasher, the tableware detergent tablet is not completely dissolved and there is residue in the dishwasher, resulting in an insufficient cleaning ability. Moreover, due to its poor emulsification effect, the solid enzyme formulation is not easy to be adhered to the tableware detergent tablet, which affects the washing effect. In the tableware detergent tablet of Comparative example 2, the polyvinyl alcohol of high molecular weight is used, and the amount of anionic surfactant is increased, the washing effect meets the standard, but a large amount of foam was introduced, and there is residual foam after washing. The commercially available 3-chamber dishwashing beads of Comparative example 3 were tested by China Light Daily Chemical Inspection and Certification Co., Ltd., and the test result of detergency was very unsatisfactory, only 0.7%. In addition, 3-chamber dishwashing beads of Comparative example 3 were used in large amount and needed to be washed for a long time in a strong washing mode. Additionally, the 3-chamber dishwashing beads need to be put into a fixed cabin of dishwasher when being used, the tableware detergent tablet of the present application only needs to be put into a dishwashing basket or the bottom of a dishwashing sink, which is more convenient and time-saving.

Comparing the test results of Example 1 to 7, Example 10 and referring to Table 2, it can be seen that the detergency of tableware detergent tablet is decreased, and the water softener is preferably the combination of trisodium methylglycine diacetate and sodium citrate in a mass ratio of 3:(1-3). Comparing the test results of Examples 1-7, Example 11 and referring to Table 2, it can be seen that the combination of sodium polyacrylate and copolymer of acrylic acid and sulfonic acid in a mass ratio of 3:(1-3) is preferable anti-stain dispersant, which is beneficial to prepare the tableware detergent tablets with better detergency.

Comparing the test results of Example 1, Example 8 and referring to Table 3, when a combination of sodium alkyl sulfate and sodium fatty acid methyl ester sulfonate in a mass ratio of 10:0.5 is used as anionic surfactants, the prepared tableware detergent tablet generates a small amount of residual foam after washing and cleaning for a short time. The anionic surfactant is preferably a combination of sodium alkyl sulfate and sodium fatty acid methyl ester sulfonate in a mass ratio of 10:(1-6).

Comparing the test results of Example 1, Example 9 and referring to Table 3, when EO-PO block polyoxyethylene ether and fatty acid methyl ester ethoxylate are used as nonionic surfactants, the prepared tableware detergent tablet has a good cleaning effect and generates less foam under less usage amount, but it will increase the difficulty of forming the tableware detergent tablet to a certain extent. The nonionic surfactant is preferably a combination of at least one of alkyl glycoside, maltitol laurate and maltooligosaccharide glucoside polymer with any other nonionic surfactants, which is beneficial to the forming when preparing the tableware detergent tablets, and is suitable for volume production, and is beneficial to avoiding the generation of a large amount of foam in the washing process.

The specific examples are only an explanation to the present application and are not a limit to the present application. Equivalent changes to the present embodiment may be made by those skilled in the art as needed after reading this specification, and should be covered within the protection scope of the present application.

What is claimed is:

1. A tableware detergent tablet, wherein the tableware detergent tablet is made of the following components in parts by mass: water-soluble polymer 15-35 parts, anionic surfactant 10-25 parts, nonionic surfactant 5-20 parts, forming additive 0.3-5 parts, polyol detergency promoter 1-10 parts, water softener 1-10 parts, anti-stain dispersant 1-10 parts, enzyme formulation 0.1-5 parts, polymer cleaning co-agent 0.3-3 parts, essence 0-1 part, and preservative 0-1 part;

wherein the water-soluble polymer is at least one of polyvinyl alcohol or polyvinyl alcohol cross-linked polymer, and the water-soluble polymer has an average molecular weight of 10000-40000;

the anionic surfactant is a combination of sodium alkyl sulfate with fatty acid methyl ester sulfonate in a mass ratio of 10:(1-6);

the water softener is a combination of trisodium methylglycine diacetate and sodium citrate in a mass ratio of 3:(1-3); and the anti-stain dispersant is a combination of sodium polyacrylate and copolymer of acrylic acid and sulfonic acid in a mass ratio of 3:(1-3).

2. The tableware detergent tablet according to claim 1, wherein the nonionic surfactant is at least one selected from the group consisting of alkyl glycoside, polymer of maltitol laurate and maltooligosaccharide glucoside, alcohol ether glycoside, fatty alcohol polyoxyethylene ether, isomeric alcohol polyoxyethylene ether, EO-PO block polyoxyethylene ether, modified oil ethoxylate, and fatty acid methyl ester ethoxylate, each of which has a C6-C18 carbon chain.

3. The tableware detergent tablet according to claim 2, wherein the nonionic surfactant is a combination of at least one of the alkyl glycoside or the polymer of maltitol laurate and maltooligosaccharide glucoside, each of which has a C6-C18 carbon chain, and any other nonionic surfactants selected from the group consisting of the alcohol ether glycoside, the fatty alcohol polyoxyethylene ether, the isomeric alcohol polyoxyethylene ether, the EO-PO block polyoxyethylene ether, the modified oil ethoxylate, and fatty acid methyl ester ethoxylate, each of which has a C6-C18 carbon chain.

4. The tableware detergent tablet according to claim 1, wherein the forming additive is at least one selected from the group consisting of carboxymethyl cellulose, polyanionic cellulose, hydroxypropyl methylcellulose and hydroxyethyl cellulose.

5. The tableware detergent tablet according to claim 1, wherein the enzyme formulation is at least one selected from the group consisting of protease, amylase, lipase, mannanase, cellulase, pectin lyase, oxidoreductase, and glycoside hydrolase.

6. The tableware detergent tablet according to claim 1, wherein the water-soluble polymer has an average molecular weight of 15000-32000.

7. The tableware detergent tablet according to claim 1, wherein the polyol detergency promoter is at least one selected from the group consisting of glycerol, ethylene glycol, propylene glycol, pentanediol, and hexanediol.

8. The tableware detergent tablet according to claim 1, wherein the enzyme formulation is liquid-type enzyme formulation or solid phase enzyme formulation.

9. The tableware detergent tablet according to claim 1, wherein the enzyme formulation is a combination of protease, amylase, and mannanase in a mass ratio of 3:(1-3):0.5.

* * * * *